June 6, 1967  S. C. BELL  3,324,114
PROCESS FOR PREPARING 3-ACYLOXY-2H-1,4-BENZODIAZEPIN-2-ONES
Filed June 26, 1964
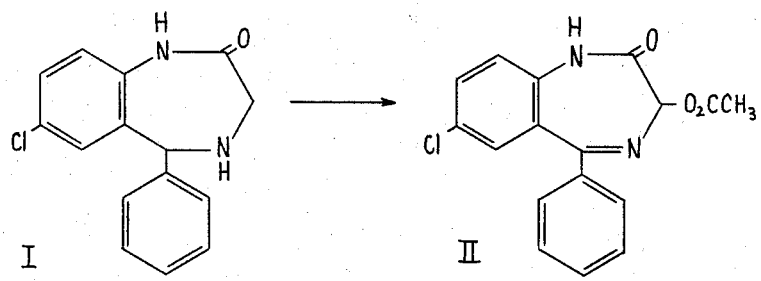
I
1,3,4,5-TETRAHYDRO-5-PHENYL-2H-1,4-BENZODIAZEPIN-2-ONE
7-chloro-1,3,4,5-tetrahydro-5-phenyl-2H-1,4-benzodiazepin-2-one
II
3-ACYLOXY-1,3-DIHYDRO-5-PHENYL-2H-1,4-BENZODIAZEPIN-2-ONE
3-acetoxy-7-chloro-1,3-dihydro-5-phenyl-2H-1,4-benzodiazepin-2-one
BY
Stanley C Bell
INVENTOR United States Patent Office 3,324,114
Patented June 6, 1967

3,324,114
PROCESS FOR PREPARING 3-ACYLOXY-2H-1,4-BENZODIAZEPIN-2-ONES
Stanley C. Bell, Philadelphia, Pa., assignor to American Home Products Corporation, New York, N.Y., a corporation of Delaware
Filed June 26, 1964, Ser. No. 378,284
4 Claims. (Cl. 260—239.3)

This application is a continuation-in-part of copending application Ser. No. 233,455, filed Oct. 26, 1962, now abandoned.

This invention relates to novel processes for preparing compositions of matter classified in the art of chemistry as 1,4-benzodiazepin-2-ones.

The invention sought to be patented is described as residing in the concept of a process in which the one-step oxidative rearrangement of a 1,3,4,5-tetrahydro-5-phenyl-2H-1,4-benzodiazepin-2-one to form a 3-acyloxy-1,3-dihydro-5-phenyl-2H-1,4-benzodiazepin-2-one is accomplished by subjecting a 1,3,4,5-tetrahydro-5-phenyl-2H-1,4-benzodiazepin-2-one to the action of an oxidizing agent and an acylating agent simultaneously in the liquid phase.

The tangible embodiments of the compositions of matter produced by the process of the invention posses the inherent applied use characteristics of being useful as sedatives and tranquilizers, as evidenced by evaluation according to standard test procedures.

The manner and process of using the invention will now be generally described so as to enable a person skilled in the art of chemistry to practice the same as follows:

For purposes of illustration, the oxidative rearrangement of 7-chloro-1,3,4,5-tetrahydro-5-phenyl-2H-1,4-benzodiazepin-2-one (I) to 3-acetoxy-7-chloro-1,3-dihydro-5-phenyl-2H-1,4-benzodiazepin-2-one (II) is shown in the drawing. Compound I is dissolved in an oxidation-resistant solvent such as acetic acid, dioxane, or chloroform, and is treated with a slight stoichiometric excess of an oxidant such as peracetic acid or hydrogen peroxide and an acylating agent such as an acyl anhydride. The solution is then heated on the steam bath for a short period of time, e.g. about 15 minutes to an hour, after which time it is cooled and diluted with one or two volumes of water. The precipitated product II is then filtered off. Heating the reaction on the steam bath is desirable in order to minimize the time needed for reaction; however, the reaction will occur at room temperature, although it requires a longer reaction time.

As indicated above, choice of solvent is not critical, provided it is not readily oxidized under the reaction conditions. Other useful oxidizing agents include performic acid, perbenzoic acid, and perphthalic acid.

The identity of the 3-acyloxy group in the compounds produced by the process is, of course, dependent on the particular acylating agent used. Suitable acylating agents include acyl anhydrides, acylhalides, ketene, and any ketene generator. Use of acetic anhydride, acetyl chloride, or a ketene generator such as isopropenyl acetate, results in the formation of a 3-acetoxy compound. When such acylating agents as chloroacetic anhydride, benzoyl chloride, or propionic anhydride are employed, the chloroacetoxy, benzoyloxy, and propionoxy groups, respectively, are introduced into the 3-position. Any oxidizing agent that performs the dual purpose of dehydrogenating the diazepin ring at the 4–5 positions and oxidizing the 4-position nitrogen to its N-oxide is operative in the present process, provided that such agent does not attack or cleave the molecule further. Such an oxidizing agent as potassium permanganate is not effective for this purpose.

Based on the art, it could not have been predicted that the tetrahydrobenzodiazepine I, which is a secondary amine, would have been oxidized predominantly to an amineoxide, rather than to a hydroxylamine compound, which latter compound will not rearrange to a 3-acyloxy compound. Furthermore, it could not have been predicted whether the acylating agent would acylate the 4-position nitrogen atom, thereby to prevent the oxidation to the 4-5-dehydro compound. It is thus a unique and unexpected result that the simultaneous oxidation to a 4-5-dehydro N-oxide with rearrangement to a 3-acyloxy compound occurs.

It will be apparent to those skilled in the art of organic chemistry that certain of the carbon and nitrogen atoms of the 1,3,4,5-tetrahydro-5-phenyl-2H-1,4-benzodiazepin-2-one nucleus other than the carbon atom at the 3-position can be substituted with noninterfering groups instead of hydrogen atoms. Therefore, in the process of the invention, except for any limitations herein expressed, all 1,3,4,5-tetrahydro-5-phenyl-2H-1,4-benzodiazepin-2-ones can be employed as starting materials in the process of this invention. The 1-position can be substituted with an alkyl group such as methyl, ethyl, or propyl; and alkenyl group such as allyl or methallyl, or a lower aralkyl group such as benzyl or phenethyl. The benzo portion of the nucleus can have at the 6,7,8, or 9-positions such substituents as lower alkyl, chlorine, bromine, trifluoromethyl, methoxy, or methylsulfonyl. The phenyl group in the 5-position of the benzodiazepine nucleus can be substituted with lower alkyl, chlorine, bromine, trifluoromethyl, methoxy, or methylsulfonyl. Processes utilizing any of these substituted compounds are the full equivalents of the process as specifically claimed.

There are, however, certain groups which interfere with or are altered by the conditions of the reaction. Such groups are therefore not intended to be included within the scope of the invention. For example, the 3- and 4-positions of the benzodiazepine nucleus cannot be substituted. The desired reactions at these positions would be hindered or prevented thereby. Furthermore, the nucleus cannot be substituted with an amino or a mercapto group. The amino group would likely be acylated and/or oxidized and a mixture of products would result. The mercapto group would be oxidized to a sulfone or sulfoxide.

The products produced by the process of the present invention possess tranquilizing, sedative, anticonvulsant, and muscle-relaxant activities. Particularly active products include 3-acetoxy-7-chloro-1,3-dihydro-5-phenyl-2H-1,4-benzodiazepin-2-one (II); 3-choloracetoxy-7-chloro-1,3-dihydro-5-phenyl-2H-1,4-benzodiazepine-2-one; 3-acetoxy-7-chloro-1,3-dihydro-1-methyl-5-phenyl-2H-1,4-benzodiazepin-2-one; 3-acetoxy-1,3-dihydro-5-phenyl-2H-1,4-benzodiazepin-2-one; and 3-acetoxy-7-chloro-5-o-chlorophenyl-1,3-dihydro-H-1,4-benzodiazepin-2-one.

The 1,3,4,5-tetrahydro-5-phenyl-2H-1,4-benzodiazepin-2-one starting materials for the present invention are prepared by treating a N-(2-amino-α-phenylbenzyl)glycine with phosphorus pentachloride or a dilute mineral acid.

The following examples set forth the best mode contemplated by the inventors of carrying out their invention.

*Example 1.—3-acetoxy-1,3-dihydro-5-phenyl-2H-1,4-benzodiazepin-2-one*

To a solution at room temperature of 0.5 g. of 1,3,4,5-tetrahydro-5-phenyl-2H-1,4-benzodiazepin-2-one in 10 ml. of acetic acid and 1 ml. of acetic anhydride, add with stirring 0.8 ml. of 40% peracetic acid. After allowing the solution to sit for 5 minutes, heat on the steam bath for 20 minutes, cool, and dilute with 2 volumes of water. Filter off the precipitated product, M.P. 225–7° C.

*Example 2.—3-acetoxy-7-chloro-1,3-dihydro-5-phenyl-2H-1,4-benzodiazepin-2-one*

Add 0.5 g. of 7-chloro-1,3,4,5-tetrahydro-5-phenyl-2H-1,4-benzodiazepin-2-one to a warm solution of 10 ml. of acetic acid and 0.8 ml. of 40% peracetic acid, and then add 1 ml. of acetic anhydride. Heat the solution on the steam bath, add water, and filter off the precipitated product, M.P. 241–3° C., as in Example 1.

The starting material for this example is prepared as follows:

Hydrogenate a solution of 25 g. of 2-amino-5-chlorobenzophenone oxime in 500 ml. of ethanol and 40 ml. of 6 N hydrochloric acid at 50–60° in the presence of 5 g. of 10% palladium on charcoal until 2 molecular equivalents of hydrogen are absorbed. Cool the solution, filter off the catalyst, and evaporate the solvent in vacuo to obtain the dihydrochloride of 2-amino-5-chloro-α-phenylbenzylamine, M.P. 221–3°.

Stir a mixture of 3 g. of this benzylamine, 1.5 g. of ethyl chloroacetate, 1.5 g. of magnesium oxide, and 75 ml. of 80% ethanol, and reflux for 18 hours. Filter the mixture while hot, and evaporate the filtrate to dryness. Triturate the residue with ethyl acetate and filter off the insoluble material. Stir this solid in a mixture of 50 ml. of water and 50 ml. ethyl acetate, and acidify with acetic acid. Separate the organic layer, evaporate to dryness, dissolve the residue in saturated sodium carbonate solution, and filter. Acidify the filtrate with acetic acid to obtain N - (2 - amino - 5 - chloro-α-phenylbenzyl)glycine, M.P. 190–2°. Conventional esterification of this benzylglycine using absolute ethanol and dry hydrogen chloride yields the ethyl ester, M.P. 102–4°. Heat either the ethyl ester or the free acid acid of this benzylglycine with 1 N hydrochloric acid on the steam bath to obtain 7-chloro-1,3,4,5 - tetrahydro-5-phenyl-2H-1,4-benzodiazepin-2-one hydrochloride, M.P. 268–70° C.; free base, M.P. 183–5°.

I claim:

1. A process for the oxidative rearrangement of 1,3,4,5-tetrahydro-5-phenyl-2H-1,4-benzodiazepin-2-one to form 3 - acyloxy-1,3-dihydro-5-phenyl-2H-1,4-benzodiazepin-2-one comprising: subjecting said tetrahydro compound to the action of per-acid oxidizing agent and an anhydride of a carboxylic acid, in the liquid phase.

2. A process for the oxidative rearrangement of 1,3,4,5-tetrahydro-5-phenyl-2H-1,4-benzodiazepin-2-one to form 3 - acyloxy-1,3-dihydro-5-phenyl-2H-1,4-benzodiazepin-2-one comprising: subjecting said tetrahydro compound to the action of peracetic acid and an anhydride of a carboxylic acid in the liquid phase.

3. A process for the oxidative rearrangement of 1,3,4,5-tetrahydro-5-phenyl-2H-1,4-benzodiazepin-2-one to form 3 - acetoxy-1,3-dihydro-5-phenyl-2H-1,4-benzodiazepin-2-one comprising: subjecting said tetrahydro compound to the action of peracetic acid and acetic anhydride in the liquid phase.

4. A process for the oxidative rearrangement of 7-chloro-5-phenyl-2H-1,4-benzodiazepin-2-one to form 3-acetoxy - 7 - chloro - 1,3-dihydro-5-phenyl-2H-1,4-benzodiazepin-2-one comprising: subjecting said tetrahydro compound to the action of peracetic acid and acetic anhydride in the liquid phase.

No references cited.

WALTER A. MODANCE, *Primary Examiner.*

R. T. BOND, *Assistant Examiner.*